C. E. CHILDS.
MIRRORSCOPE.
APPLICATION FILED MAY 18, 1921.
1,399,461.
Patented Dec. 6, 1921.
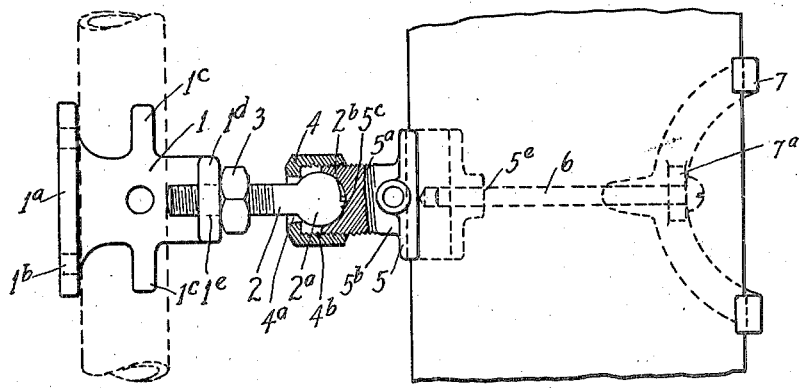
FIG. 1.
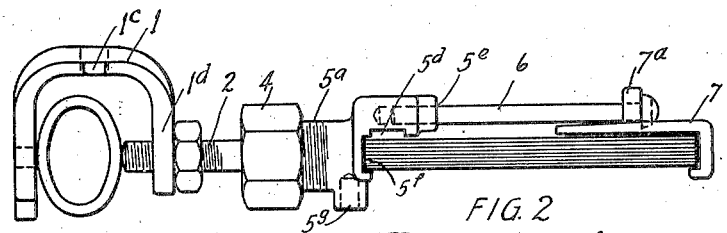
FIG. 2.
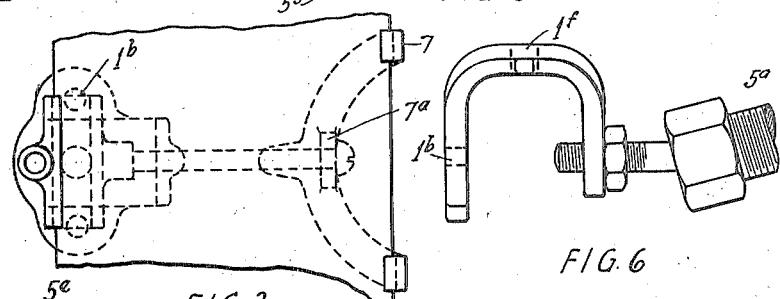
FIG. 3.
FIG. 6.
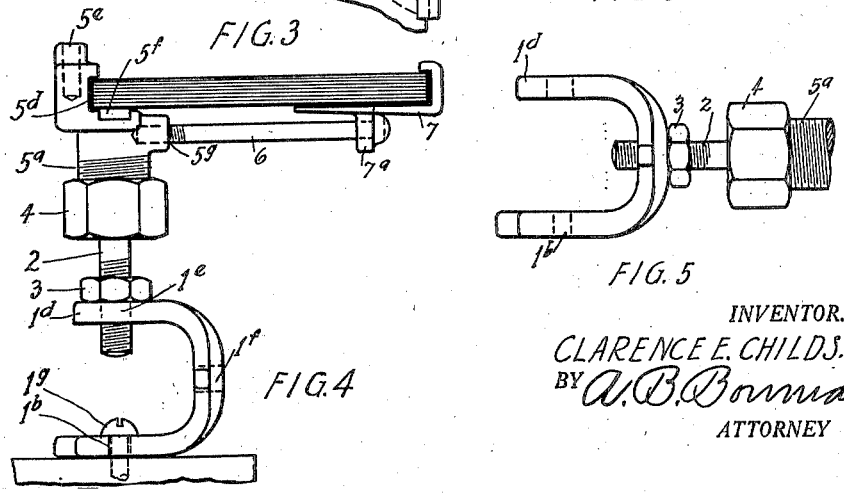
FIG. 4.
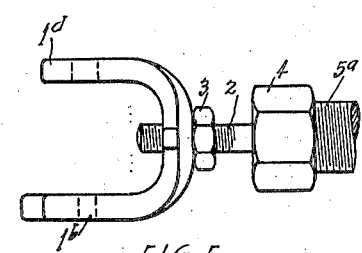
FIG. 5.
INVENTOR.
CLARENCE E. CHILDS.
BY A. B. Bowman
ATTORNEY

UNITED STATES PATENT OFFICE.

CLARENCE E. CHILDS, OF SAN DIEGO, CALIFORNIA.

MIRRORSCOPE.

1,399,461.     Specification of Letters Patent.     Patented Dec. 6, 1921.

Application filed May 18, 1921. Serial No. 470,581.

*To all whom it may concern:*

Be it known that CLARENCE E. CHILDS, a citizen of the United States, residing at San Diego, in the county of San Diego and State of California, has invented certain new and useful Improvements in Mirrorscopes, of which the following is a specification.

My invention relates to a support for mirrorscopes to be used for reflecting images behind a vehicle, so that the operator can readily determine whether there are any objects at the rear of the vehicle when driving, and the objects of my invention are, first, to provide a mirrorscope of this class which is interchangeable so that the mirror portion may be supported in practically any position desired and may be secured to the windshield post or to the flat interior surface of an inclosed vehicle body and a support changeable for varying positions as well as providing means for changing the position of the mirror relatively to the main support; second, to provide a device of this class in which the mirror clamp is changeable so that the shank in connection with a clamp portion may be in alinement with the mirror or at a right angle thereto as desired; third, to provide a main support for securing to the vehicle body which may be changed to a clamp member or be secured thereon in varying positions; fourth, to provide a device of this class in which the clamp screws perform the double function of providing a portion of the clamp member as well as serving as a ball for a ball and socket joint for the mirror clamp support; fifth, to provide a novelly constructed mirrorscope, and sixth, to provide a device of this class, which is very simple and economical of construction, durable, easy to operate, applicable for use in any position desired, compact in form, easy to change from one position to another and which will not readily deteriorate or get out of order.

With these and other objects in view, as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:—

Figure 1, is a front elevational view of the mirrorscope, shown positioned on the windshield post of the vehicle and showing one position of the mirror relatively thereto, and showing portions broken away and in sections to facilitate the illustration. Fig. 2, is a top view of said mirrorscope shown positioned on the windshield post, showing the post in section. Fig. 3, is a rear elevational view of the mirrorscope shown positioned against the flat surface of an inclosed vehicle body and showing the mirror part fragmentarily. Fig. 4, is a top or plan view thereof. Fig. 5, is a fragmentary view of the main support portion with the clamp screws positioned in another position therein and Fig. 6, is a similar view showing a device in another changed position with the mirror support positioned at an angle to the main support 1.

Similar characters of reference refer to similar parts and portions throughout the several views of the drawings.

The main vehicle engaging support member 1, bolt 2, lock nut 3, socket can 4, socket clamp member 5, bolt 6 and mirror clamp 7 constitute the principal parts and portions of my mirrorscope.

The main support member 1 is a U-shaped member, broadened at one side $1^a$, and provided with spaced apart holes $1^b$, therein, which are adapted to receive wood screws $1^g$ for securing the device on any flat surface. It is provided intermediate it ends with oppositely disposed lugs $1^c$, which provide an extended support along the windshield post or any member to which it is clamped. The other portion from the portion $1^a$, which I have designated $1^d$, is provided with a threaded hole $1^e$ therein which is adapted for the threaded end of the bolt 2 to be screwed therein and when used as a clamp the end of this bolt 2, is forced against the other side of the members upon which it is clamped from the portion $1^a$. This bolt 2 is provided with a lock nut 3, thereon which is adapted to be set up against the portion $1^b$ for securing the bolt 2 relatively to the member 1 after the bolt 2 is properly set. This bolt 2 is provided with a spherical shaped head $2^a$, which is provided with a slot $2^b$ therein, which is adapted to facilitate the turning of the bolt 2 by means of a screw driver. Mounted over this bolt 2 and adapted to rest against the head $2^a$ is a cap nut 4, which is provided with a hole $4^a$ therein, which hole is considerably larger than the diameter of the bolt 2, but not large enough to permit the head 2ᵃ to pass therethrough, thus providing for the angular positioning of the bolt 2 relatively to the nut 4, so that it may be turned on any angle relatively to said cap nut 4, within reasonable bounds and as shown best in Fig. 6 of the drawings. This cap nut 4 is provided with internal threads 4ᵇ, which are adapted to fit the external threads 5ᵃ on the shank portion 5ᵇ of the mirror clamp member 5. This shank portion 5ᵇ is provided with a semispherical recess 5ᶜ in its extended end and is adapted to fit snugly the end of the bolt head 2ᵃ. This member 5 is provided with a duplicate mirror portion edge engaging slot and screw receiving recess, positioned at right angles to each other, as shown best in Fig. 2 of the drawings, consisting of a slot 5ᵈ and a threaded hole 5ᵉ, positioned at a right angle to the main alinement of a similar slot 5ᶠ and a similar threaded hole 5ᵍ, shown best in Fig. 2 of the drawing.

It will be here noted that the slots 5ᵈ and 5ᶠ are adapted to receive one edge of the mirror portion of the mirrorscope when in position at right angles to each other, and that the threaded holes 5ᵉ and 5ᵍ are adapted to receive the threaded end of the bolt 6 when in said similar position. The head of the bolt 6 supports a clamp member 7 which is preferably a bifurcated member as shown best in Figs. 1, 2 and 3 of the drawings, which members extend over the opposite edge of the mirror portion of the mirrorscope and this member is provided with an extended lug 7ᵃ, which receives the head end of the bolt 6, so that by turning the bolt 6, into the threaded holes 5ᵉ or 5ᵍ, the member 7 clamps the other edge of the mirror portion of the mirrorscope and holds said mirror portion rigidly in position in either of the positions shown in Fig. 2 of the drawings, or in Fig. 4, these positions being at right angles to each other relatively to the shank portion of the member 5.

It will be noted that the mirror may be any shape desired although it is preferred to use a mirror of elliptical form.

Though I have shown and described a particular construction, combination and arrangement of parts and portions, I do not wish to be limited to this particular construction, combination and arrangement but desire to include in the purview of my invention, the construction, combination and arrangement substantially as set forth in the appended claims.

It is obvious that with this construction, there is provided a mirrorscope in which the mirror may be positioned at varying angles from the main support; that it may be turned upwardly or downwardly from alinement from the main support; that the main support is so constructed that it may be readily clamped to the windshield post of the vehicle or it may be secured to a flat surface by means of screws or bolts; that when clamped it may be clamped in varying positions around the post and when secured by screws, or bolts on a flat surface, may be secured in varying positions; that one of the mirror clamp members is so constructed that it will support the mirror in two positions at right angles to each other, so that the mirror may be positioned in two positions at right angles to each other relatively to the shank portion of said clamp member; that the shank member may be positioned on various angles to the bolt 2; that the mirror may be positioned closer to the main support 1 if desired when the member 1 is secured by means of screws and bolts, by simply screwing the member 2 farther into the member 1; that the several parts are adjustable and changeable so that the mirror portion of the mirrorscope may be positioned in a variety of positions as desired.

Having thus described my invention what I claim as new and desire to secure by Letters Patent is,

1. A mirrorscope including a supporting member, a bolt adapted to screw therein provided with a spherical head, a clamp member provided with a socket portion adapted to engage said head, a lock nut adapted to screw thereon and engage the opposite side of said head, another clamp member and means for securing said clamp members in certain relative position to each other.

2. A device of the class described including a U shaped supporting member, provided with holes in one side thereof, a threaded hole in the other side thereof, a bolt with a spherical head adapted to screw in said threaded hole, a lock nut for said bolt adapted to secure it in certain relative position to said support, and socket means adapted to be secured to said spherical head and form a clamp member for one side of a mirror, and means for securing another clamp member to the opposite side of said mirror, and to said clamp member.

3. A device of the class described including a U shaped supporting member, provided with holes in one side thereof, a threaded hole in the other side thereof, a bolt with a spherical head adapted to screw in said threaded hole, a lock nut for said bolt adapted to secure it in certain relative position to said support, socket means adapted to be secured to said spherical head and form a clamp member for one side of a mirror and means for securing another clamp member to the opposite side of said mirror and to said clamp member, said first mentioned clamp member being provided with recesses and threaded holes at right angles to each other.

4. A device of the class described including, a main U shaped supporting member, provided with holes in one side thereof adapted for wood screws or bolts, a threaded hole in the other side thereof, another hole intermediate said threaded hole and the holes in the other side, a spherical headed bolt provided with threads adapted to be screwed into said intermediate hole or the threaded hole on one side, a lock nut for securing said threaded hole relatively to said support and clamp means provided with a slot and adapted to be secured on said spherical head for supporting said mirror on said spherical head.

5. A device of the class described including, a main U shaped supporting member, provided with holes in one side thereof adapted for wood screws or bolts, a threaded hole in the other side thereof, another hole intermediate said threaded hole and the holes in the other side, a spherical headed bolt provided with threads adapted to be screwed into said intermediate hole or the threaded hole on one side, a lock nut for securing said threaded bolt relatively to said support, clamp means provided with a slot and adapted to be secured on said spherical head for supporting said mirror on said spherical head consisting of a clamp member provided with a threaded shank with a semi-spherical recess in one end adapted to receive a portion of the head of said bolt, a clamp nut adapted to screw thereon and engage the other side of said spherical head, by clamping it rigidly, another clamp member adapted to engage the opposite side of said mirror portion and a bolt for securing said clamp members together against the edges of said mirror portion.

6. A device of the class described including a main U shaped supporting member, provided with holes in one side thereof, adapted for wood screws, or bolts, a threaded hole in the other side thereof, another hole intermediate said threaded hole and the holes in the other side, a spherical headed bolt provided with threads adapted to be screwed into said intermediate hole or the threaded hole on one side, a lock nut for securing said threaded bolt relatively to said support, clamp means provided with a slot and adapted to be secured on said spherical head for supporting said mirror on said spherical head, consisting of a clamp member provided with a threaded shank with a semi-spherical recess in one end adapted to receive a portion of the head of said bolt, a clamp nut adapted to screw thereon and engage the other side of said spherical head, by clamping it rigidly, another clamp member adapted to engage the opposite side of said mirrorscope, a bolt for securing said clamp members together against the edges of said mirror portion, said clamp member being provided with grooves at right angles to each other and threaded holes positioned at right angles to each other, adapted to receive the edge of said mirror and the end of the bolt.

In testimony whereof, I have hereunto set my hand at San Diego, California, this 12th day of May 1921.

CLARENCE E. CHILDS.